June 20, 1967

J. F. TAPLIN

3,326,517

TORQUE ARM BALANCED VALVE

Filed June 1, 1964

INVENTOR:
JOHN F. TAPLIN,
BY *[signature]* ATTORNEY

United States Patent Office 3,326,517
Patented June 20, 1967

3,326,517
TORQUE ARM BALANCED VALVE
John F. Taplin, 15 Sewall St.,
West Newton, Mass. 02165
Filed June 1, 1964, Ser. No. 371,472
1 Claim. (Cl. 251—282)

This invention relates to balanced valves for controlling the flow of fluid.

It is a general object of this invention to improve valves of the aforementioned description.

There are many applications of balanced valves involving space limitations wherein space limitations in regard to height are more stringent than in regard to length.

It is, therefore, another object of this invention to provide balanced valves having minimized height requirements and having valve balancing means which tend to increase the length, but not the height, of the valves.

It is another object of the invention to provide balanced valves wherein liquid that may have collected in the region of the valve balancing means may readily be drained off to a fluid trap.

Figure 1:
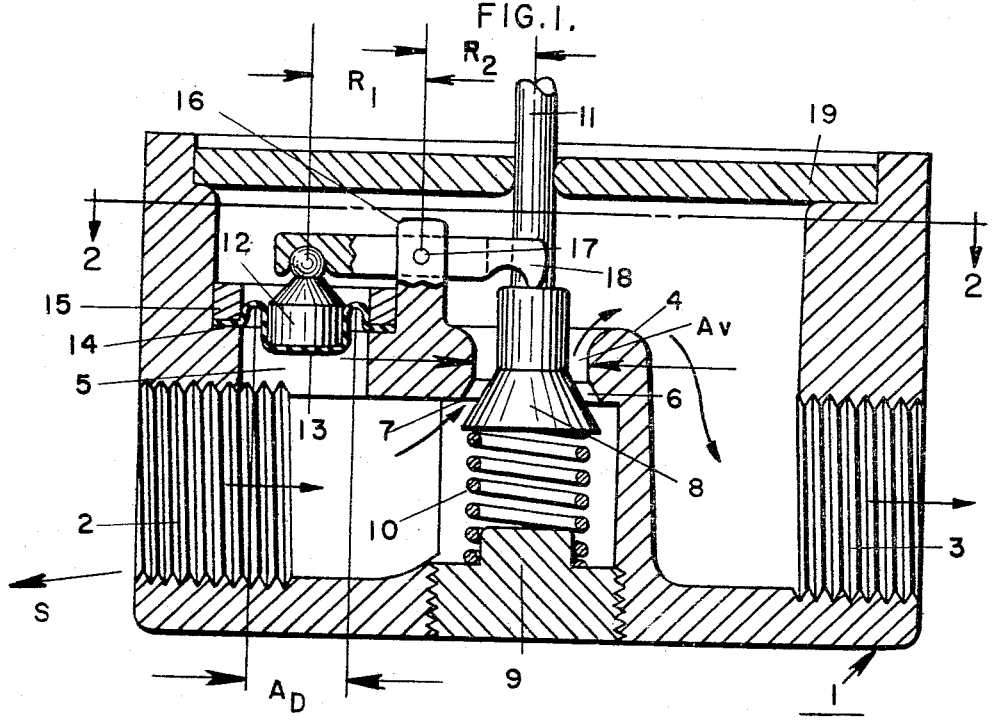
Figure 2:
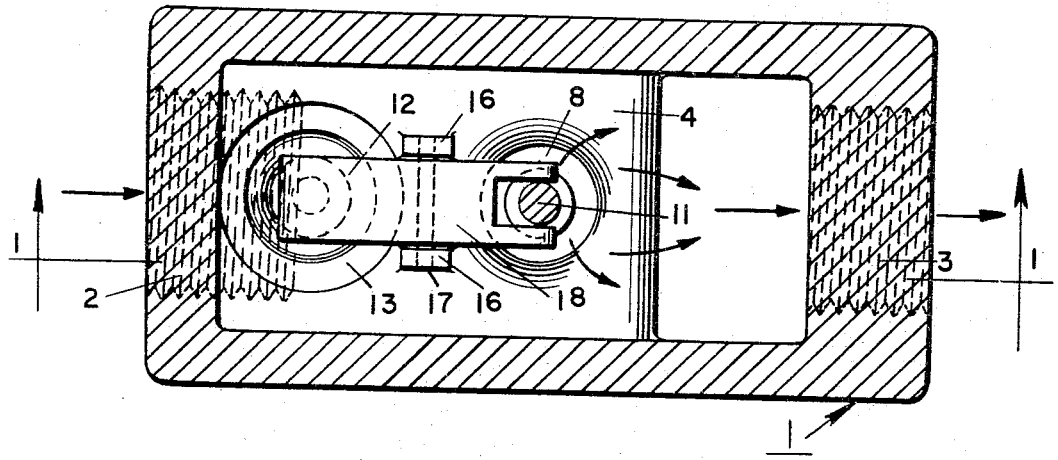

The invention, both as to its organization and method of operation will be described in greater detail below in connection with the accompanying drawings wherein FIG. 1 is a vertical section of a balanced valve embodying this invention taken substantially along 1—1 of FIG. 2; and FIG. 2 shows the structure of FIG. 1 taken along 2—2 of FIG. 1.

Referring now to the drawings, numeral 1 has been applied to generally indicate a valve body. Valve body 1 defines an inlet port 2 and a coaxial outlet port 3. Partition 4 subdivides port 2 from outlet port 3. Partition 4 defines an upstream passage 5 and a downstream passage 6 both establishing communications between inlet port 2 and outlet port 3. Passage 6 forms a valve seat 7 adapted to be engaged by valve element 8 controlling the flow of fluid through passage 6. The bottom of valve body 1 is closed by a screw-threaded plug 9 forming a support for helical biasing spring 10 resting against the lower surface of valve element 8. The latter is supported by a valve stem 11 arranged in coaxial relation to passage 6, valve element 8, spring 10, and plug 9. Piston 12 is loosely arranged inside of passage 5, i.e. there is a substantial clearance between the passage 5 and piston 12. A rolling diaphragm 13 forms a transverse partition across passage 5. Rolling diaphragm 13 comprises a radially inner portion affixed to the lower end surface of piston 12, a radially outer portion clamped against a shoulder 14 formed by valve body 1 by means of ring insert 15, and a rolling wall intermediate said radially inner portion and said radially outer portion. Ring insert 15 may be held in position by any appropriate means as, for instance, screw threads (not shown). Partition 4 forms on the upper side thereof a pair of lugs 16 supporting pivot pin 17. The latter, in turn, pivotally supports a balancing or torque-transmitting lever 18. This lever 18 has two arms. Its left arm is provided with a spherical cavity engaged by a spherical projection on the upper end surface of piston 12. The right arm of lever 18 is fork-shaped and engages the upper surface of valve element 8 to both sides of valve stem 11.

In FIG. 1 reference character $A_D$ has been applied to indicate the effective area of rolling diaphragm 12, reference character $A_V$ to indicate the effective area of the valve formed by valve element 8 and passage 5, reference character $R_1$ to indicate the force arm of lever 18, and reference character $R_2$ to indicate the load arm of lever 18. The torque equation of balance then reads as follows:

$$A_D \times R_1 = A_V \times R_2$$

Liquid collected in the region of passage 5 may readily be drained off to a fluid trap (not shown) as indicated by arrow S.

Valve body 1 is closed on the top thereof by a cover or lid 19 which may be held in place by screws (not shown). Valve stem 11 may be operated by any desired operating means. The structure of FIGS. 1 and 2 is particularly suited to be used as a pressure regulator. In that particular application a regulator piston (not shown) will be substituted for cover or lid 19 acted upon on the lower side thereof by the pressure prevailing at the downstream end of passage 5 and acted upon on the upper side thereof or by spring pressure. The circular gap formed between such a regulator piston and valve body 1 may be closed by a second rolling diaphragm (not shown) having a radially inner portion attached to the lower end surface of the regulator piston, a radially outer portion attached to part 1, and a roll wall situated between said radially inner portion and said radially outer portion.

The mode of operation of the structure which has been described above in connection with the drawing will be apparent from the above torque equation of balance. If there is a relative increase of pressure on the intake side of the structure resulting in an increased upward thrust upon valve element 8, there will be an equal increase in the downward thrust exerted by lever 18 upon valve element 8. On the other hand, if there is a relative decrease of pressure on the intake side of the structure resulting in a reduced upward thrust upon valve element 8, there will be an equal decrease in the downward thrust exerted by lever 18 upon valve element 8.

A number of arrows in FIGS. 1 and 2 indicate the direction of fluid flow when valve element 8 is out of engagement with valve seat 7.

It will be apparent from the foregoing that piston 12 and rolling diaphragm 13 are a pressure difference sensing element which is movable in a direction longitudinally of stem 11 in response to changes in pressure at the intake port 2 and at the outlet port 3.

It will be apparent from the foregoing that valve body 1 includes a partition 4 separating the inlet port 2 from the outlet port 3, both ports 2, 3 being arranged in coaxial relation. Partition 4 includes a first portion shown to the left of FIG. 1, substantially parallel to the common axis of inlet port 2 and outlet port 3. Partition 4 further includes a second portion substantially at right angles to the axis of inlet port 2 and outlet port 3, this second portion—as seen in FIG. 1—being situated to the right of said first portion of partition 4. The aforementional first portion of partition 4 defines an upstream passage 5 extending transversely through said first portion of said partition, and a downstream passage 6 extending transversely through said first portion of said partition 4. A rolling diaphragm 13, or equivalent thereof, is arranged in and closes said upstream passage 5 and a movable valve element 8 controls the flow of fluid through downstream passage 6. Balance lever 18 pivotally supported by the aforementioned first portion of partition 4 transmits variable torques from diaphragm 13, or an equivalent thereof, to valve element 8 controlling the effective area of downstream passage 6. Since rolling diaphragm 13 and valve 7, 8 are arranged substantially at the same level, the height requirements of the valve are minimized at the expense of its length requirements. This is very desirable since the height available is limited in a large number of applications, while no particular limits are generally imposed in regard to the length of the valve.

The drawings show a preferred embodiment of my invention. It is, however, my intention to cover all modifications of the preferred structure which do not constitute a significant departure from the invention as set forth in the following claim.

I claim as my invention:

A balanced valve comprising in combination:

(a) a valve body defining an inlet port and a coaxial outlet port and having a partition separating said inlet port from said outlet port, said partition defining an upstream passage and a downstream passage both substantially at right angles to said inlet port and to said outlet port and both having one end communicating with said inlet port and both having another end communicating with said outlet port;
(b) a piston loosely arranged in said upstream passage;
(c) a rolling diaphragm comprising a radially inner portion secured to one of the end surfaces of said piston, a rolling wall and a radially outer portion secured to said partition;
(d) a valve element arranged inside of and controlling fluid flow through said downstream passage; and
(e) a balance lever pivotally supported by said partition, said balance lever having one arm acted upon by said piston and another forked arm acting upon said valve element.

References Cited
UNITED STATES PATENTS

| | | | |
|---|---|---|---|
| 159,732 | 2/1875 | Wiesebrock | 137—505.18 |
| 644,406 | 2/1900 | Crawford | 137—505.18 |
| 907,771 | 12/1908 | Fulton | 251—283 X |
| 2,362,476 | 11/1944 | Frische | 251—281 |

M. CARY NELSON, *Primary Examiner.*

ALAN COHAN, *Examiner.*

R. C. MILLER, *Assistant Examiner.*